Patented May 9, 1933

1,907,497

UNITED STATES PATENT OFFICE

SOLOMON CAPLAN, OF BROOKLYN, NEW YORK, ASSIGNOR TO COMBUSTION UTILITIES CORPORATION, OF NEW YORK, N. Y., A CORPORATION OF MAINE

PRODUCTION OF SYNTHETIC RESINS

No Drawing.  Application filed January 15, 1930. Serial No. 421,057.

This invention relates to synthetic resins, and more particularly it involves methods for the refining of coal tar and the like containing tar acids, and the preparation therefrom of synthetic resins of the phenol formaldehyde type in relatively pure form.

Synthetic resins have been prepared in the past from various phenols and phenol homologues and derivatives or mixtures thereof by treatment of these substances with aldehyde-containing substances, with or without a reaction catalyst. Furthermore synthetic resins have been produced direct from tar oils and various distillates thereof by direct treatment of the latter with aldehydes and catalysts without first separating the tar-acid constituents from the hydrocarbons and other substances present in such distillates. The co-pending application #737,130 of Stephen P. Burke now matured as Patent 1,814,124, discloses such a method by which is produced a potentially-reactive synthetic resin suitable for use in molding compositions, lacquers, varnishes, and the like. In such processes, known prior to the present invention, it has been highly difficult to remove the last portions of hydrocarbon oil, known as neutral oil, from the resin produced in the condensation reaction. The presence of this neutral oil in the resin in some instances may appreciably modify the properties of the latter to adapt it for certain uses. Generally this presence of such oil in the resin is undesirable.

Attempts to refine the resins produced in processes of the above-mentioned type, for the purpose of removing the neutral oil therefrom, have not been entirely satisfactory due to the tenacity with which the resin retains such oil, and due to the difficulty of controlling the conditions of the refining treatment to prevent the transition of the resin to the bakelite "C" stage, in which state it is unworkable and of no commercial value.

The present invention has for one of its principal objects therefore the refining of a tar-acid bearing oil or distillate in a manner to remove substantially all of the tar acid components thereof with a minimum loss of the neutral oil, while concurrently producing a potentially reactive synthetic resin of the phenol-formaldehyde type in relatively pure form.

Among other objects of the invention are to provide in an improved manner for producing a synthetic resin substantially free from neutral oil directly from a crude or a refined tar such as coal tar and any or all of the distillates thereof; to provide for the production direct from tar oil or distillates thereof of a potentially-reactive synthetic resin having a high degree of curability upon exposure to a curing heat; to provide an improved process for producing potentially-reactive synthetic resins from tar and tar oils whereby the said resins are substantially free from neutral oil and other impurities; and to provide in a process for producing synthetic resins directly from tar oils and distillates thereof, for so controlling the conditions of the reaction as to substantially obtain the maximum possible yield of potentially-reactive resins.

In its broadest scope the invention involves the treatment of a tar oil or of a petroleum oil or one or more fractional distillates thereof containing tar acids or phenolic substances, with an aldehyde-containing substance, preferably in the presence of a relatively small amount of a suitable catalyst. At some stage during the treatment the mixture has incorporated therein a suitable amount of volatile solvent for the neutral oil portion of the tar oil, as for example petroleum naphtha. The resin should be insoluble or but slightly soluble in the solvent used. This reaction mixture is heated for a suitable length of time while being constantly agitated, after which it is permitted to settle and,—in the case where no solvent has been incorporated prior to the heat treatment,—a suitable quantity of the solvent,—such as petroleum distillate,—is now added to the reaction mixture preferably with the addition of water. In the case mentioned, the volatile solvent and water may if desired be added successively to the reaction mixture, though it is generally preferred to add them concurrently to the latter. This dilution of the hydrocarbon or neutral oil with the volatile solvent, in conjunction with the flotation of the oil upon the aqueous liquid layer tends to facilitate separation of the resin from the reaction mixture and make possible the low cost production of a relatively oil-free synthetic resin. The thus diluted reaction mixture may then be allowed to settle.

The reaction mixture separates very rapidly upon standing into three superposed layers. The upper layer consists of neutral oil containing the dissolved petroleum naphtha or other solvent and any organic bases and other substances in the tar oil that are soluble in petroleum naphtha. A middle aqueous layer contains the water introduced into the reaction vessel with the formalin and catalyst solution and also that added later, together with any water formed during the reaction. The bottom layer consists of the resin containing some occluded water and an extremely small amount of naphtha solution of neutral oil. These impurities are readily removed from the resin by suitable distillation preferably in vacuum to a resin temperature of around 96° C. or less. After the water and solvent are distilled off, the temperature of the resin may be permitted to rise above this temperature, as for example to 105° C., for thickening purposes. The resin may then be run into a shallow vessel and allowed to cool therein, being converted to a hard brittle resinous mass practically free of oil. In many instances even when the condensation reaction is conducted in the absence of any volatile solvent, the resultant reaction mixture upon being permitted to settle, with or without the addition of a suitable amount of a volatile solvent and/or water, will separate into three layers of the character described above. In such case the resin layer may first be separated from the other two superposed layers, and after such separation it may be treated with a suitable volatile solvent to remove any portions of neutral oil and the like occluded thereby.

The following examples will illustrate certain preferred forms of procedure exemplifying the present invention, although they are not to be in any way construed as limitations thereon. A tar distillate comprising the total distillate of a low temperature tar oil distilled to a vapor temperature of 300° C. and having a tar acid content of 32% by volume,—(the tar acids having a mean molecular weight of approximately 129,)— was mixed with U.S.P. formalin and a normal sodium hydroxide solution in the relative proportions of 300 litres of the tar distillate, 87½ kilograms of the formalin, and 20 litres of the sodium hydroxide solution. The mixture was heated in a reaction vessel equipped with a reflux condenser while being constantly agitated and it was maintained at the boiling temperature for 45 minutes. The heating was then discontinued and 600 litres of petroleum naphtha added together with 200 litres of water. The water functions merely to increase the volume of the aqueous layer subsequently formed upon the settling of the reaction mixture and thus facilitates the separation of the resin layer from the hydrocarbons and the aqueous liquid layer. The mixture was then agitated for a few minutes and was allowed to settle. Three sharply-defined liquid layers promptly formed. The bottom layer, comprising resin together with some occluded water and a small amount of a naphtha solution of residual oil, was heated rapidly in a vacuum to a resin temperature of around 96° C. while agitating it. Under these conditions the mass was maintained fairly mobile and the water and naphtha in the resin layer readily distilled off, after which the temperature of the resin was allowed to rise to 105° C. and was maintained there until the resin was suitably thickened. The resultant viscous resin was formed into a thin layer and allowed to cool and harden. It was of the bakelite "A" type, being potentially-reactive and readily convertible to the bakelite "C" stage upon heating at 180° C. After such curing treatment for thirty minutes the resin contained but 1.3% of acetone-soluble resin, indicating that 98.7% thereof was curable under the conditions named. A number of runs made under exactly the conditions outlined above, excepting that no petroleum naphtha or its equivalent was employed in the process, gave relatively much lower yields of resins, in large part due to portions of the resin remaining suspended or dissolved in the residual tar oil. Moreover, in the runs in which petroleum naphtha or its equivalent was not employed, the purity of the resins obtained in the different runs varied materially but was distinctly less than that of the resins produced in similar runs in which such volatile solvents were employed.

In the above mentioned example it may be noted that the tar-acid containing distillate, formaldehyde and sodium hydroxide solution, were present in the relative molecular proportions of 1 mol. of tar acids, 1⅓ mols. of formaldehyde, and .0248 mol. NaOH. The relative proportions of tar oil and the aldehyde-containing substance may be varied within fairly wide limits, but the aldehyde should preferably be present in somewhat greater amount than equi-molecular proportions with respect to the tar acid components of the tar oil employed. For example, relative proportions of the tar-acid containing distillate and formaldehyde corresponding to 1 mol. of the tar acid aquivalent of the said distillate to 1.1 mol. of formaldehyde produces a satisfactory potentially reactive resin when the reaction mixture is subsequently treated with petroleum naphtha or other suitable solvent in accordance with the present invention during the resin recovery step. Other catalysts may be employed in place of the sodium hydroxide solution. Alkaline catalysts are preferred, particularly alkaline compounds of the alkali metals. Within certain limits the proportion of the catalyst employed has a direct bearing both on the yield of resins based on the tar acid content of the tar oil employed and also with regard to the relative degree of curability of the resin. For example when carrying out the steps of the present invention employing a ratio of ingredients based on 1 mol. equivalent of tar acids per 1⅓ mols. of formaldehyde and a reaction period of 1 hour, the use of .0062 mols. NaOH gives a resinous product, 9.8% of which is soluble in acetone after curing. When .0186 mols. of NaOH are employed under the same conditions, 4½% of the resultant resin is soluble in acetone after curing; and when .0248 mols. of NaOH is employed, 3.95% of the resin is soluble in acetone after curing. These figures are based on runs made employing the distillate up to 300° C. from a low-temperature tar.

The time of reaction between the various ingredients is also found to be an essential factor in determining the character of the resin produced in accordance with the present invention. The percent of the synthetic resin that is soluble in acetone after cure evidently increases with the time employed for condensation, for any given molecular concentration of NaOH employed.

To illustrate the effect upon the yield of resin of increasing the amount of catalyst employed, a series of runs were made in which a low temperature tar distillate having a boiling range to 300° C. was reacted with formaldehyde for 1 hour at boiling temperature in the presence of varying amounts of NaOH. The said distillate and formaldehyde were present in the relative proportions of 1 mol. equivalent of the tar acids present in the said distillate, and 1⅓ mols. of formaldehyde. The reaction mixture was treated with petroleum naphtha in amount twice the amount of the distillate used. The yield obtained when employing .0186 mol. NaOH was almost 60% greater than that obtained under similar conditions using .0062 mol. NaOH; still further increasing the NaOH to .0248 mols., the yield of resin was increased only 8% above that obtained with the .0186 mol. concentration. The yield of resins increases for a given concentration of catalyst with increasing time of condensation up to a maximum, after which it tends to remain quite constant. For instance, in reacting with formaldehyde upon a low temperature tar distillate having a boiling range to 300° C. in the presence of NaOH as a catalyst,—these being present in the relative proportions of 1 mol. equivalent of tar acids, 1⅓ mols. formaldehyde, and .0248 mol. NaOH,—a condensation period of 1 hour gave a yield of resin over 50% greater than that obtained under similar conditions excepting that a condensation time of 15 minutes was employed.

There appears however to be an optimum amount of solvent which may be employed to give the best yields of resin from the various tar distillates while at the same time producing a high quality potentially-reactive resin. This optimum will vary somewhat depending on the nature of the tar distillate employed and the relative proportions of the reactants. In the case of the treatment of the above mentioned 300° C. low temperature tar distillate in which the reactants are present in the proportion of a quantity of distillate equivalent to 1 mol. of the tar acid components thereof, to 1⅓ mols. of formaldehyde to .0248 mols. of sodium hydroxide and the mixture is reacted for three-quarters of an hour at the boiling temperature,—the subsequent employment of petroleum naphtha in the ratio of 2 parts of the naphtha to 1 part of the original distillate yields a resin 1.3% of which is soluble in acetone after curing; whereas in a similar run in which no petroleum naphtha was employed the final product had a solubility in acetone of 9.5%. The naphtha-treated reaction mixture gave a resin yield 10% higher than the reaction mixture in which no naphtha was employed. The ratio of solvent to the tar oil or distillate employed may be varied within certain limits without having any objectionable influence upon the yield of the resultant resins and without substantially affecting the potentially reactive nature of the resins. Satisfactory results have been obtained from the formaldehyde treatment of low temperature tar distillates of boiling range up to 300° C. in which the latter was used in amount equivalent to one mol. of the tar acid content thereof for each 1⅓ mol. of formaldehyde used, and in which in the subsequent solvent treatment the solvent was used in volume equivalent to and even in an amount ½ that of the distillate. When much smaller proportions of solvent to distillate are used however, the yield of the synthetic resin is materially reduced.

Other tar distillates representing much more extended cuts than the 300° C. distillate already described have been successfully employed. A very satisfactory, potentially-reactive resin was produced from a fraction of low temperature tar distillate, representing 75% of the tar by volume and having a tar acid content of 30% (the mean molecular weight of tar acids being about 165). This distillate was treated with U. S. P. formalin and normal sodium hydroxide solution in the relative proportions of 300 litres of the distillate, 70 kilograms of the formalin and 10 litres of the sodium hydroxide solution. After boiling and agitating the mixture for one hour, the heating was discontinued and the mixture was thereafter diluted with 600 litres of petroleum naphtha and 200 litres of water. The usual three-layer separation immediately followed; and the resin layer was removed and subjected to vacuum distillation in the manner already described.

It is possible also to produce synthetic resins in accordance with this invention direct from the tar itself. For example a quantity of low temperature tar produced by a process involving the indirect heating of bituminous fuel was reacted with U.S.P. formalin and a normal caustic alkali solution in the relative molecular proportions of an amount of the tar equivalent to 1 mol. of tar acids present in the tar, 1⅓ mols. of formaldehyde and .0167 mols. of caustic alkali. The mixture was boiled and agitated for one-half hour, after which it was cooled and diluted with solvent naphtha, (a commercial mixture of xylenes), and water in amounts respectively equal to twice the volume of the tar employed and to ⅔ of the volume of the tar employed. The solvent naphtha tends to reduce or inhibit the precipitation from the residual tar of pitchy material which ordinarily occurs when a petroleum distillate, such as petroleum naphtha, is used in treating the reaction mixture from the condensation treatment of tar. Carbon bisulphide and carbon tetrachloride may be substituted for the solvent naphtha. After separation of the reaction mixture into the three layers in the usual manner, the resin layer was segregated and was distilled in vacuum at 80° C. Any of the known processes for purifying and thickening the resin at atmospheric pressure may also be used. The resultant product possessed the usual characteristics of resins of this type and showed very slight solubility in acetone after curing.

In the modification of the present invention in which the solvent is added to the mixture of reactants prior to the heat treatment employed for the condensation, this solvent then serves to reduce the viscosity of the mixture and to permit a more ready intermixture of the various ingredients. However the employment of this plan introduces several difficulties such as that of keeping the boiling temperature sufficiently high to facilitate rapid interaction unless the reaction be performed in a pressure vessel under superatmospheric pressures. It has therefore been found generally desirable to carry out the reaction in the absence of any added volatile solvent for the neutral oil. This makes possible the use of a simpler type of reaction vessel of less costly construction. The solvent treatment may be subsequently made in a larger vessel of cheaper construction.

In instances where the resin layer formed during the settling of the reaction mixture is separated from the other layers prior to its treatment with solvent, the dilution of the large volume of neutral oil with solvent is avoided and the problem of solvent recovery is much simplified. Furthermore where the solvent is added directly to the separated resin, the washing and solvent action of the solvent is clearly intensified, cooling being simultaneously effected, so that a smaller amount thereof is sufficient to give the desired results, and the purified resin is substantially freed from neutral oil. Under these conditions the final vacuum distillation treatment applied to the resin may be shorter and more effective.

It is to be observed that in dealing with these complex mixtures containing various tar acids, the resins formed early in the course of the condensation are appreciably more reactive and more susceptible of being transformed into the infusible-insoluble form than are the resins produced at a later period in the condensation. Advantage may be taken of this fact to separate successively various fractions of condensation products as they are produced. Each of such resin fractions, after its separation from the reaction mixture, may be separately treated with the solvent thus producing a series of synthetic resins having different degrees of responsiveness to curing heat.

While vacuum distillation of the resin is preferred for the removal therefrom of the last traces of neutral oil, solvent, and water,—yet it is not essential, and the distillation treatment may be carried out in an open vessel at atmospheric pressure. Moreover in place of utilizing a vacuum for removing the final traces of hydrocarbons and moisture from the resins, it is possible to pass through the resin steam or other suitable vapors, or both vacuum and vapor treatment may be employed simultaneously.

In instances where the volatile solvent is selected with a view to its utilization with the neutral oil which is diluted therewith, no step of recovering the said solvent need be undertaken. If a low boiling solvent such as gasoline is employed, it may be removed from the neutral oil if desired by distillation or equivalent methods. By selecting the solvent employed, it is possible to vary the character of the recovered neutral oil within certain limits.

The tar acid-containing distillate may be fortified if desired with other phenols or homologues or derivatives thereof, such as phenol, cresol, xylenols, and the like, prior to the condensation thereof with the aldehyde containing materials. Furthermore other substances capable of reacting with aldehyde and phenolic bodies and/or the like to produce condensation products of a more or less resinous nature,— such as ketones, glycerine, urea, thiourea, and the like,—may be added to the said distillates prior to the condensation. In place of the petroleum naphtha and the solvent naphtha referred to, there may be substituted any other organic solvent in which synthetic resins of the phenol formaldehyde type are relatively insoluble and in which the hydrocarbon oils of the character of neutral oil are relatively soluble. Other examples of such suitable solvents are tetra- and decahydronaphthalene, and turpentine.

When utilizing certain high and low temperature tar distillates it is often desirable to prewash the same with aqueous liquids such as water or with water containing small amounts of soluble alkaline compounds or inorganic acids, for the purpose of removing therefrom certain deleterious water soluble substances which normally interfere with the production of satisfactory resins. Such a treatment may, for example, consist of washing the tar distillate with a 2% aqueous solution of sodium carbonate. The washed distillate is then reacted in the manner disclosed.

It is within the contemplation of the present invention to substitute for the formalin other substances containing one or more active methylene groups, such as furfural and the like. To such substances may be added relatively small amounts of other aldehydes such as butyl aldehyde and paraldehyde. In place of using the tar-acid containing oils or distillates in the form in which they are produced, it is possible to first subject them to various treatments for the removal of certain of their constituents, such as polyhydric phenols, and organic bases, providing the tar-acid content is not completely destroyed or eliminated thereby.

By carrying out the principles of the invention in the manner exemplified above I am able to accomplish the various objects aforementioned and to produce from various crude, relatively cheap materials and complex mixtures containing phenolic bodies, tar acids and the like,—relatively pure synthetic resins possessing properties adapting them for use in the production of electrical apparatus, machinery parts, laminated products, impregnating and coating compositions, and for substantially any purpose for which a synthetic resin of the phenol formaldehyde type is suitable.

The invention is susceptible of modification within the scope of the appended claims.

I claim:

1. The process for producing synthetic resins of the phenol formaldehyde type which comprises reacting a low temperature tar containing tar-acids with at least one aldehyde in the presence of an alkali metal hydroxide catalyst while heating and agitating the mixture until a condensation reaction and the formation of a synthetic resin has occurred, thereafter diluting the reaction mixture and cooling it with an organic solvent for the hydrocarbon and asphaltic components of the tar but in which the resin is relatively insoluble, adding water to the thus diluted mixture and agitating it, thereafter permitting the same to settle and separate into three immiscible layers, including a layer containing a potentially reactive synthetic resin, separating the resin layer from the others and subjecting it to distillation in vacuum.

2. The process for producing synthetic resins of the phenol formaldehyde type direct from an unrefined low temperature tar distillate containing tar acids, which comprises reacting said distillate with an aldehyde in the presence of an alkali metal hydroxide under the influence of heat and agitation to produce a condensation reaction and the formation of a mixture containing a synthetic resin, thereafter permitting the reaction mixture to separate into three immiscible layers, a top one comprising principally hydrocarbon oil with some resin, a second layer comprising principally an aqueous solution, and a third layer of resin containing some hydrocarbons, and treating one of the said resin containing layers with an organic solvent for the hydrocarbon oil portion in which solvent the said resin is substantially insoluble to facilitate the separation of the synthetic resin from the hydrocarbon oil.

3. The process of producing a synthetic resin of the phenol formaldehyde type which comprises reacting on a low temperature tar oil containing tar acids with an aldehyde in the presence of an alkali metal hydroxide catalyst while heating and agitating the same to cause a condensation reaction to occur between the tar acid content of the tar oil and the aldehyde and the formation of a synthetic resin, thereafter adding an organic solvent for the hydrocarbon oil portion of the tar oil in which solvent the synthetic resin produced by the said condensation reaction is substantially insoluble, the said solvent and hydrocarbon oil being in a ratio not less than 1:2, permitting the resultant mixture to settle and separate into three superposed layers, one of which contains the synthetic resin, and separating the said resin layer from the others.

4. The process as defined in claim 3 in which commercial petroleum naphtha is employed as the organic solvent in amounts at least equal in volume to the volume of the tar oil treated.

5. The process as defined in claim 3 including the subsequent step of heating the separated resin layer to temperatures not exceeding about 105° C. under vacuum.

6. The process of producing potentially-reactive synthetic resins of the phenol formaldehyde type which comprises reacting a low temperature tar oil containing tar acids with an aldehyde in the presence of an alkaline inorganic hydroxide catalyst, and heating and agitating the mixture to facilitate the condensation reaction and the production of a synthetic resin, thereafter discontinuing the heat treatment and diluting the mixture with an organic solvent for the hydrocarbon portion of the tar oil but in which the resin is relatively insoluble, the said solvent being used in amount not less than one-half the volume of the hydrocarbon portion of the tar oil, agitating the mixture and thereafter allowing the same to settle to form three superposed layers, one of which contains synthetic resin with occluded water and a small amount of the solvent solution of the hydrocarbon portion of the tar oil, separating the said resin layer from the others and heating the same in vacuum at suitable temperatures to remove water and solvent and to thicken the resin.

7. The process as defined in claim 6 in which the tar oil employed is a low temperature tar distillate the major portion of which distills at temperatures below 300° C.

8. The process of producing a potentially-reactive synthetic resin of the phenol formaldehyde type which comprises reacting a low temperature tar distillate containing tar acids with an aqueous solution of an aldehyde, and an alkali metal hydroxide as a catalyst under the influence of heat to facilitate a condensation reaction and the production of a synthetic resin, thereafter diluting the reaction mixture with a solvent for the hydrocarbon component of the tar distillate in which solvent the said synthetic resin is substantially insoluble, thereafter allowing the mixture to settle and separate into three superposed layers, one of which contains the synthetic resin with a relatively small amount of occluded water and solvent solution of the said hydrocarbon oil, separating the said resin layer from the others and subjecting it while under vacuum to heat and agitation to remove the water and solvent and to thicken the resin, and thereafter permitting the latter to cool and harden.

9. The process of producing a potentially-reactive synthetic resin of the phenol formaldehyle type which comprises reacting on a crude tar oil containing higher low temperature tar acids and having a distillation range up to at least 300° C. with an aqueous solution of an aldehyde and an alkali metal hydroxide catalyst while heating the mixture, thereby causing a condensation reaction to occur between the tar acid components of the tar oil and the said substance and the production of a synthetic resin, thereafter adding an organic solvent for the hydrocarbon oil portion of the tar oil and in which the synthetic resin is substantially insoluble permitting the resultant mixture to settle and separate into a plurality of superposed layers, one of which contains the said resin, separating the resin layer from the others and thickening the resin.

10. The process for producing synthetic resins of the phenol formaldehyde type direct from a low temperature tar distillate containing tar acids which comprises washing the said distillate with an aqueous liquid, thereafter reacting the washed distillate with an aldehyde in the presence of an alkali metal hydroxide catalyst under the influence of heat and agitation to produce a condensation reaction and the formation of a mixture containing a synthetic resin, treating the reaction mixture with an organic solvent for the hydrocarbon oil portion in which the said resin is relatively insoluble, and thereafter permitting the reaction mixture to separate into three immiscible layers, a top one comprising principally hydrocarbon oil, a second layer comprising principally an aqueous solution and a third layer of resin, the solvent being present in amount by volume at least one-half that of the original distillate reacted.

11. The process for producing synthetic resins of the phenol formaldehyde type direct from a low temperature tar distillate containing tar acids, which comprises reacting said distillate with an aldehyde in the presence of a non-volatile basic inorganic catalyst under the influence of heat and agitation to produce a condensation reaction and the formation of a mixture containing a synthetic resin, thereafter permitting the reaction mixture to separate into three immiscible layers, a top one comprising principally hydrocarbon oil, a second layer comprising principally an aqueous solution and a third layer of resin and, prior to the said separation, treating the reaction mixture with an organic solvent for the hydrocarbon oil portion in which the said resin is relatively insoluble to facilitate the separation of the neutral oil from the synthetic resin, the solvent being present in amount by volume at least one-half that of the original distillate.

12. The process for producing synthetic resins of the phenol-formaldehyde type direct from a tar oil containing hydrocarbons and tar acids, which comprises washing the said oil with an aqueous liquid, thereby removing water-soluble impurities, separating the washed oil from the aqueous liquid and reacting the former with an aldehyde in the presence of a non-volatile basic inorganic catalyst thereby effecting a condensation reaction and forming a mixture containing a synthetic resin, permitting the reaction mixture to separate into three immiscible layers, that include a top layer made up principally of hydrocarbon oil with some resin, a middle layer comprising principally an aqueous solution, and a third layer of resin containing some hydrocarbons, treating one of the said resin-containing layers with an organic solvent for the hydrocarbon portion in which solvent the said resin is substantially insoluble, thereby facilitating the separation of the synthetic resin from hydrocarbons present, and recovering the said resin.

13. The process for producing synthetic resins of the phenol-formaldehyde type direct from an oil containing hydrocarbons and tar acids, which comprises washing the said oil with water, thereby removing water-soluble impurities, separating the washed oil from the water and reacting the former with an aldehyde in the presence of an alkali metal hydroxide catalyst thereby producing a condensation reaction and forming a mixture containing a synthetic resin, permitting the reaction mixture to separate into three immiscible layers that include a top layer made up principally of hydrocarbon oil with some resin, a middle layer comprising principally an aqueous solution, and a third layer of resin containing some hydrocarbons, treating one of the said resin-containing layers with an organic solvent for the hydrocarbon portion in which solvent the said resin is substantially insoluble, thereby facilitating the separation of the synthetic resin from hydrocarbons present, and recovering the said resin.

14. The process for producing synthetic resins of the phenol formaldehyde type direct from a low temperature tar distillate containing tar acids, which comprises reacting said distillate with an aldehyde in the presence of an alkali metal hydroxide catalyst, thereby producing a reaction mixture containing a synthetic resin, thereafter permitting the reaction mixture to separate into three immiscible layers, a top layer comprising principally hydrocarbon oil, a second layer comprising principally an aqueous solution, and a third layer of resin, and treating the resin layer with water and an organic solvent for the hydrocarbon oil portion in which solvent the said resin is substantially insoluble, thereby facilitating separation of neutral oil from the resin, the solvent being present in about twice the amount by volume of the original distillate reacted, and in greater volume than the added water, and recovering the resin.

In testimony whereof I affix my signature.

SOLOMON CAPLAN.